United States Patent
Tsirkin

(10) Patent No.: US 11,281,487 B2
(45) Date of Patent: Mar. 22, 2022

(54) MANAGING PROCESSOR OVERCOMMIT FOR VIRTUAL MACHINES

(71) Applicant: RED HAT, INC., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 133 days.

(21) Appl. No.: 16/740,198

(22) Filed: Jan. 10, 2020

(65) Prior Publication Data

US 2021/0216344 A1 Jul. 15, 2021

(51) Int. Cl.
*G06F 9/455* (2018.01)
*G06F 9/48* (2006.01)
*G06F 9/54* (2006.01)
*G06F 9/50* (2006.01)

(52) U.S. Cl.
CPC ........ *G06F 9/45558* (2013.01); *G06F 9/4812* (2013.01); *G06F 9/505* (2013.01); *G06F 9/5077* (2013.01); *G06F 9/542* (2013.01); *G06F 9/546* (2013.01); *G06F 2009/45562* (2013.01); *G06F 2009/45583* (2013.01); *G06F 2209/5018* (2013.01); *G06F 2209/5022* (2013.01)

(58) Field of Classification Search
CPC .... G06F 9/45558; G06F 9/4812; G06F 9/505; G06F 9/5077; G06F 9/542; G06F 9/546; G06F 2009/45562; G06F 2009/45583; G06F 2009/5018; G06F 2009/5022
See application file for complete search history.

(56) References Cited

U.S. PATENT DOCUMENTS

| | | | |
|---|---|---|---|
| 9,043,789 B2 | 5/2015 | Tsirkin et al. | |
| 9,720,712 B2 | 8/2017 | Tsirkin | |
| 2014/0068603 A1* | 3/2014 | Tsirkin | G06F 9/5083 718/1 |
| 2014/0068605 A1* | 3/2014 | Tsirkin | G06F 9/5077 718/1 |

OTHER PUBLICATIONS

"Performance Best Practices for VMware vSphere 6.5", VMware ESXi 6.5, vCenter Server 6.5, VMware, http://www.vmware.com/support/, downloaded Sep. 4, 2019, 106 pgs.
Gabriel Southern, "Analysis of SMP VM CPU Scheduling", George Mason University, gsouther@gmu.edu, downloaded Sep. 4, 2019, 8 pgs.

* cited by examiner

*Primary Examiner* — Diem K Cao
(74) *Attorney, Agent, or Firm* — Lowenstein Sandler LLP

(57) ABSTRACT

Systems and methods for managing processor overcommit for virtual machines are disclosed. In one implementation, a processing device may identify, by a hypervisor running on a host computer system, an over-committed physical processor, the physical processor is executing a thread implementing a first virtual processor (vCPU) of a virtual machine (VM). The processing device may further queue, by the hypervisor, a message notifying the VM of hot-unplugging of the first vCPU. Responsive to receiving, by the hypervisor, a notification of a second vCPU of the VM transitioning into an idle state, the processing device may also transmitting the message to the VM.

20 Claims, 8 Drawing Sheets

MANAGING PROCESSOR OVERCOMMIT FOR VIRTUAL MACHINES

TECHNICAL FIELD

The present disclosure is generally related to computer systems, and more particularly, to managing processor overcommit for virtual machines.

BACKGROUND

Data centers may include clusters consisting of multiple hosts (e.g., physical servers). Each of the hosts may run one or more containers, such that each container provides an isolated execution environment in the user space of the host operating system, sharing the kernel with other containers. Each container executes one or more related processes providing a certain service (e.g., an HTTP server, a database server, etc.). Data centers may also include virtual servers where, for example, various operating systems concurrently and in isolation from other operating systems may run on one or more interconnected physical computer systems. Virtualization allows, for example, consolidating multiple physical servers into one physical server running multiple virtual machines in order to improve the hardware utilization rate. Virtualization may be achieved by running a layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

BRIEF DESCRIPTION OF THE DRAWINGS

The present disclosure is illustrated by way of examples, and not by way of limitation, and may be more fully understood with references to the following detailed description when considered in connection with the Figures, in which.

DETAILED DESCRIPTION

Figure 1:
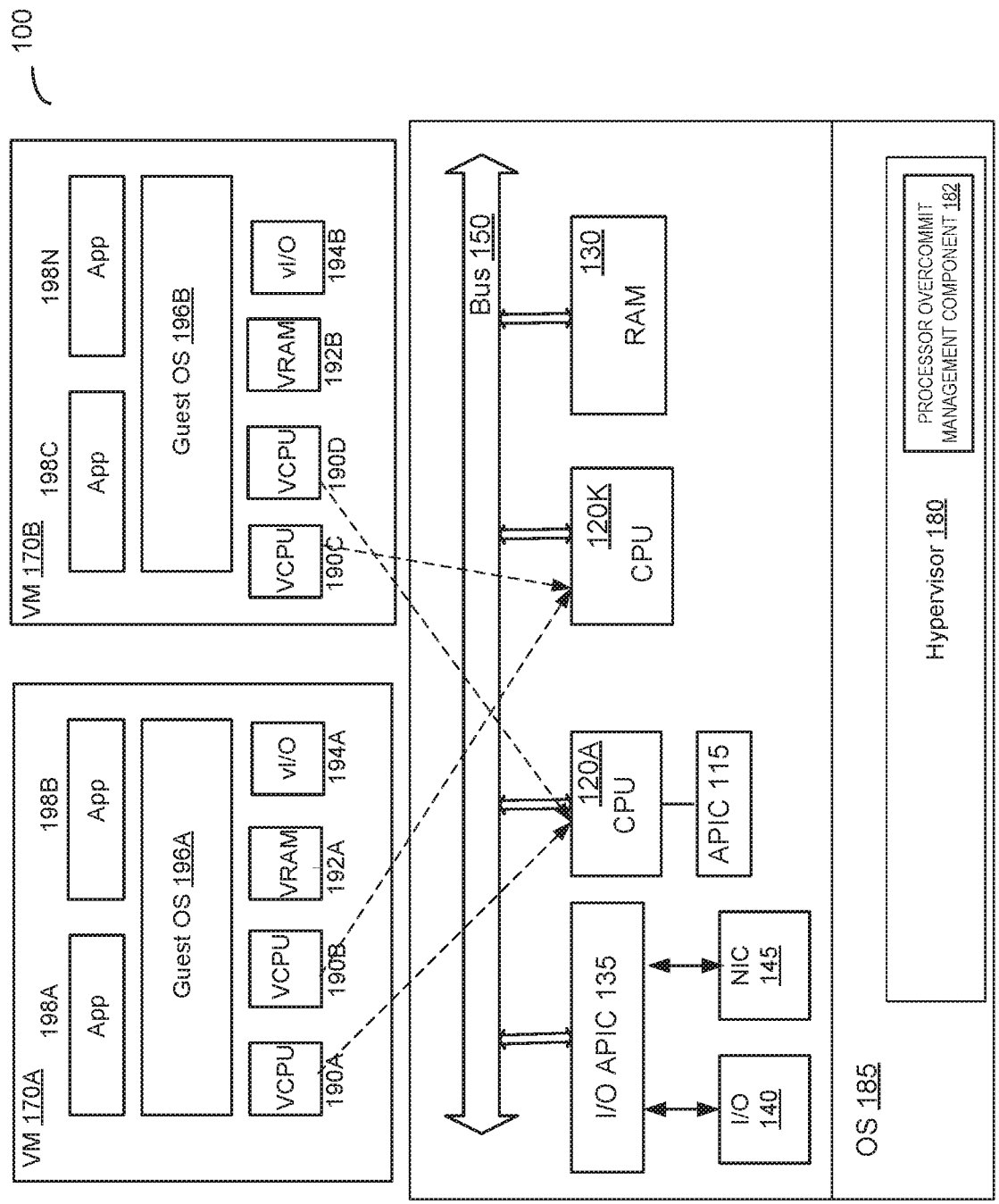
FIG. 1 is a block diagram that illustrates an embodiment of a host computer system, in accordance with one or more aspects of the present disclosure.

Described herein are methods and systems for managing physical processor over-commitment for virtual machines running on a host computer system. An overcommitted processor may refer to a physical processor where two or more virtual processors are running concurrently. Each virtual processor may be implemented by a respective processing thread that may be scheduled to run on the physical processor. In implementations, an overcommitted physical processor may be identified by determining that a task is waiting to be executed by the physical processor while the physical processor is executing a thread implementing a virtual processor. Scheduling two or more virtual processors to run on a single physical processor may result in unpredictable latencies and conflicts because each virtual machine may expect its virtual processors to be running at all times (e.g. each on a separate physical processor). Thus, when two virtual processors run on the same physical processor, unpredictable conflicts as well as performance penalties may arise. Therefore, it is generally recommended that overcommitting physical processors be avoided in hosts where multiple virtual machines may run.

On the other hand, when the physical processors in a host computer system are under-utilized (e.g. the host does not have sufficient system load to keep the physical processors running at reasonable capacity most of the time), the host may benefit from overcommitted physical processors. For example, the host may utilize techniques to enable processing of multiple tasks in parallel using one physical processor. Thus it may be desirable to enable processor over-commitment. When processor over-commit is enabled, then it may be desirable to preempt a vCPU thread running on the overcommitted processor and schedule another task (e.g., thread implementing another vCPU) on the physical processor.

The present disclosure alleviates the above-noted and other deficiencies by providing a method for low overhead vCPU hot unplugging. In accordance with one or more aspects of the present disclosure, a hypervisor may issue a request of hot-unplugging a vCPU upon detecting that the vCPU is running on an over-committed physical processor of the host system. In implementations, the hypervisor may detect the over-committed physical processor by detecting that a certain task has been waiting to be executed by the physical processor. An over-committed physical processor may be a physical processor executing two or more virtual processors, such that tasks submitted for execution by the physical processor are having to wait for a predetermined period of time before being selected for execution by the physical processor. The hypervisor may further detect that the over-committed physical processor is executing a thread implementing a virtual processor (vCPU) of a virtual machine (VM). The hypervisor may then issue a request to hot-unplug the vCPU from the VM in order to allow the waiting task to be executed. Hot-unplugging a vCPU may refer to the process of disassociating the vCPU from the VM without causing the VM to shut down.

Because hot-unplugging a running vCPU from a VM may cause unpredictable performance and latency issues, the hypervisor may defer the vCPU unplug notification until one of the vCPUs associated with the VM transitions into an idle state. In implementations, the hypervisor may queue a notification message to hot-unplug the vCPU. For example, the hypervisor may store the notification message in a queue data structure that is accessible to the hypervisor, until the hypervisor is ready to send the notification message out to the recipient. The hypervisor may then transmit the notification message to the VM when detecting that one of the vCPUs associated with the VM is in an idle state. In implementations, the notification message may be transmitted to the VM using an inter-processor interrupt (IPI). An inter-processor interrupt is a technique supported by certain processor architectures to provide a mechanism to interrupt the processor or group of processors on the system bus. IPIs may be used for software self-interrupts, interrupt forwarding, or preemptive scheduling. Alternatively, other suitable notification mechanisms (e.g., via shared memory) may be used to transmit the notification message to the VM.

In an illustrative example, the hypervisor may detect that one of the vCPUs of the VM is transitioning to an idle state because the vCPU performed a VM exit. The hypervisor may then transmit the hot-unplug notification message to the VM. For example, the hypervisor may send an interrupt to a vCPU of the VM to hot-unplug the vCPU running on the physical processor. In other implementations, the VM may continue to execute in a busy state with no vCPUs transitioning to idle for an extended period of time. In this case, the hypervisor may decide to transmit the hot-unplug notification to the VM using a shared memory region that is accessible to the hypervisor and to the vCPUs of the VM.

Alternatively, sending a message from the hypervisor to the VM may be performed using memory monitoring. While in the guest execution mode, each vCPU may perform memory monitoring (e.g., using x86-64 MONITOR/MWAIT instructions, their analogs on other execution platforms, or other memory access instructions) in order to receive notifications of newly arriving interrupts from other vCPUs or the hypervisor. In this mode, the hypervisor may send a message to a vCPU of the VM by updating a shared memory region that is accessible to the hypervisor and the VM to store the notification message. The vCPU may then receive the message by performing memory monitoring of the shared memory region, without having to perform a VM exit. In this case, the hypervisor may use the shared memory region to send a notification message to the VM to hot-unplug a vCPU. One of the vCPUs of the VM may then read the message via memory monitoring and may perform an interrupt to hot-unplug the vCPU.

In certain implementations, the hypervisor may detect an under-committed physical processor of the host computer system in (may be referred to herein as an under-committed physical processor). An under-committed physical processor may be a physical processor that is executing a number of tasks per unit time that does not meet a predetermined threshold. For example, a physical processor may be in the under-committed state if the number of CPU cycles of the physical processor consumed in executing tasks is less than a certain threshold. In another example, a physical processor may be in the under-committed state if the processor is idle for a time period exceeding a certain threshold. When the hypervisor detects the under-committed physical processor, the hypervisor may decide to schedule a new thread (e.g., implementing a vCPU) on the under-committed physical processor. In one example, the hypervisor may assign the new vCPU to a VM running on the host. In this case, the hypervisor may select a VM with a system load that exceed a threshold and may assign the new vCPU to the selected VM. For example, the hypervisor may select a VM where a measure of system load of the VM exceeds a certain threshold. In implementations, the measure of system load may be the number of physical processor cycles consumed executing the virtual processors of the VM. In another example, the hypervisor may move a vCPU from another processor (e.g., an over-committed processor) to the under-committed processor.

In implementations the hypervisor may send a message to a VM with a large system load, notifying the VM of hot-plugging of the new vCPU. Hot-plugging of a vCPU may refer to the process of adding a new vCPU to a set of vCPUs associated with the VM without causing the VM to shut down. In certain implementations, the hypervisor may not need to queue a notification message of hot-plugging a new vCPU before sending the message to the VM. The hypervisor may directly transmit the hot-plugging notification message to the VM because the VM is able to efficiently handle the hot-plugging of the new vCPU. For example, the VM may use mechanisms such as symmetric multi-processing (SMP) to synchronize the new vCPU with the existing vCPUs of the VM. In implementations, the hypervisor may send an interrupt to one of the vCPUs associated with the VM to hot-plug the new vCPU.

Thus, the systems and methods described herein represent improvements to the functionality of general purpose or specialized computing devices, by implementing efficient CPU overcommit for virtual machines to enable symmetrical multi-processing (SMP) for processing multiple tasks in parallel in a virtualized environment. Enabling CPU overcommit further facilitates reduced cost of virtual machine deployment because more virtual machines maybe hosted in the computer system when the physical processors of the host can be overcommitted such that each physical processor may implement multiple virtual processors. The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

FIG. 1 depicts a high-level component diagram of an illustrative example of a computer system 100 operating in accordance with one or more aspects of the present disclosure. Computer system 100 may include one or more processors 120 communicatively coupled to memory devices 130 and input/output (I/O) devices 140 via a system bus 150.

Examples of "processors" (also referred herein as "processing devices" or CPUs) include various devices that are capable of executing instructions encoding arithmetic, logical, or I/O operations. In an illustrative example, a processor may follow Von Neumann architectural model and may include an arithmetic logic unit (ALU), a control unit, and a plurality of registers. In another aspect, a processor may be a single core processor which is capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

Examples of "memory devices" include volatile or non-volatile memory devices, such as RAM, ROM, EEPROM, or any other devices capable of storing data. Examples of "I/O devices" include devices providing an interface between a processor and an external device capable of inputting and/or outputting binary data.

Computer system 100 may further comprise one or more Advanced Programmable Interrupt Controllers (APIC), including one local APIC 115 per processor and one or more I/O APICs 135. Local APIC 115 may receive interrupts from local sources (including timer interrupts, internal error interrupts, performance monitoring counter interrupts, thermal sensor interrupts, and I/O devices connected to the processor's local interrupt pins either directly or via an external interrupt controller) and externally connected I/O devices (i.e., I/O devices connected to an I/O APIC), as well as inter-processor interrupts (IPIs).

Certain processor architectures support inter-processor interrupts (IPI) to provide a mechanism to interrupt another processor or group of processors on the system bus. IPIs may be used for software self-interrupts, interrupt forwarding, Transaction Lookaside Buffer (TLB) shutdown, or preemptive scheduling. In an illustrative example, a processor may generate IPIs by programming the interrupt command register (ICR) in its local APIC. Writing to the ICR causes an IPI message to be generated and issued on the system bus or on the APIC bus. IPIs may be sent to other processors in the system or to the originating processor (self-interrupts). The information written into the ICR includes the type of IPI message to be sent and the destination processor identifier. When the destination processor receives an IPI message, its local APIC processes the message using the information included in the message (such as vector number and trigger mode).

Computer system 100 may run one or more virtual machines 170A-170B, by executing a virtual machine manager 180, often referred to as "hypervisor," above the hardware and below the virtual machines, as schematically illustrated by FIG. 1. In one illustrative example, hypervisor 180 may be a component of operating system 185 executed by host computer system 100. Alternatively, hypervisor 180 may be provided by an application running under host operating system 185, or may run directly on host computer system 100 without an operating system beneath it. Hypervisor 180 may abstract the physical layer, including processors 120, memory 130, and I/O devices 140, and present this abstraction to virtual machines 170A-170B as virtual devices. A virtual machine 170 may execute a guest operating system 196 which may utilize underlying virtual processors (also referred to as virtual central processing units (vCPUs)) 190, virtual memory 192, and virtual I/O devices 194. A number of vCPUs 190 from different virtual machines may be mapped to one processor 120. One or more guest applications 198 may be running on a virtual machine 170 under a guest operating system 196. Guest operating system and guest applications are collectively referred to herein as "guest software."

In certain implementations, processor virtualization may be implemented by the hypervisor scheduling time slots on one or more physical processors for virtual processors. In an illustrative example, a virtual processor may be implemented by a processing thread that may be scheduled to run on one of the host physical processors.

Device virtualization may be implemented by intercepting virtual machine memory read/write and/or input/output (I/O) operations with respect to certain memory and/or I/O port ranges, and by routing hardware interrupts to a virtual machine associated with the corresponding virtual device. Memory virtualization may be implemented by a paging mechanism allocating the host RAM to virtual machine memory pages and swapping the memory pages to a backing storage when necessary.

Various functions for handling processor overcommit may be performed by a processor overcommit management component 182 running on host computer system 100 and operating in accordance with one or more aspects of the present disclosure. In certain implementations, processor overcommit management component 182 may be implemented as a software component invoked by hypervisor 180. Alternatively, functions of processor overcommit management component 182 may be performed by hypervisor 180.

In implementations processor overcommit management component 182 may detect that processor 120K is in an over-committed because processor 120K is executing vCPU 190B of VM 170A and vCPU 190C of VM 170B. Processor overcommit management component 182 may further detect that a certain task has been waiting to be executed by processor 120K, and that processor 120K is currently executing a task for vCPU 190C. Processor overcommit management component 182 may then decide that vCPU 190C may be hot-unplugged from VM 170B in order to allow the waiting task to be executed.

In order to avoid interrupting VM 170B while in the middle of execution, processor overcommit management component 182 may decide to defer sending the notification of hot-unplug to VM 170B until one of vCPUs 190C-D associated with VM 170B transitions into an idle state. In implementations, processor overcommit management component 182 may queue a notification message to hot-unplug vCPU 190C, and may then transmit the notification message to VM 170B when detecting that one of the vCPUs associated with VM 170B is in an idle state. For example, processor overcommit management component 182 may send an interrupt to vCPU 190D of VM 170B to hot-unplug vCPU 190C. In other implementations, VM 170B may continue to execute in a busy state with no vCPUs transitioning to idle for an extended period of time. In this case, processor overcommit management component 182 may decide to transmit the hot-unplug notification to the VM using a shared memory region that is accessible to all the vCPUs of VM 170B. In this case, processor overcommit management component 182 may use the shared memory region to send a notification message to VM 170B to hot-unplug vCPU 190C. One of the vCPUs 190C-D may then read the message via memory monitoring and may perform an interrupt to hot-unplug vCPU 190C.

In certain implementations, processor overcommit management component 182 may detect an under-committed physical processor 120A-K of the host 100. For example, a physical processor may be in the under-committed state if the number of CPU cycles of the physical processor consumed in executing tasks within a predetermined period pf time is less than a certain threshold. Processor overcommit management component 182 may decide to execute a new thread implementing a new vCPU (e.g. vCPU 190E, not shown) on the under-committed physical processor and may assign the new vCPU 190E to one of VMs 170A-B that has a bigger system load. In implementations, processor overcommit management component 182 may select a VM where a measure of system load of the VM exceeds a certain threshold. In an example, the measure of system load may be represented by a ratio of processor idle time to elapsed time, such that the load exceeds a threshold if this ratio is equal to a certain value (e.g., 80%, 90%, 95%, etc.) For example, processor overcommit management component 182 may detect that VM 170A has a vCPU that is running close to 100% capacity, thus may assign the new vCPU 190E to VM 170A. In another example, the measure of system load may be represented by a number of physical CPU cycles consumed executing a virtual processor of the VM during a predetermined period of time. Processor overcommit management component 182 may then send a message to VM 170A, notifying the VM of hot-plugging of the new vCPU 190E. In implementations, the processor overcommit management component 182 may send an interrupt to one of vCPUs 190A-B of VM 170A to hot-plug vCPU 190E.

Figure 2:
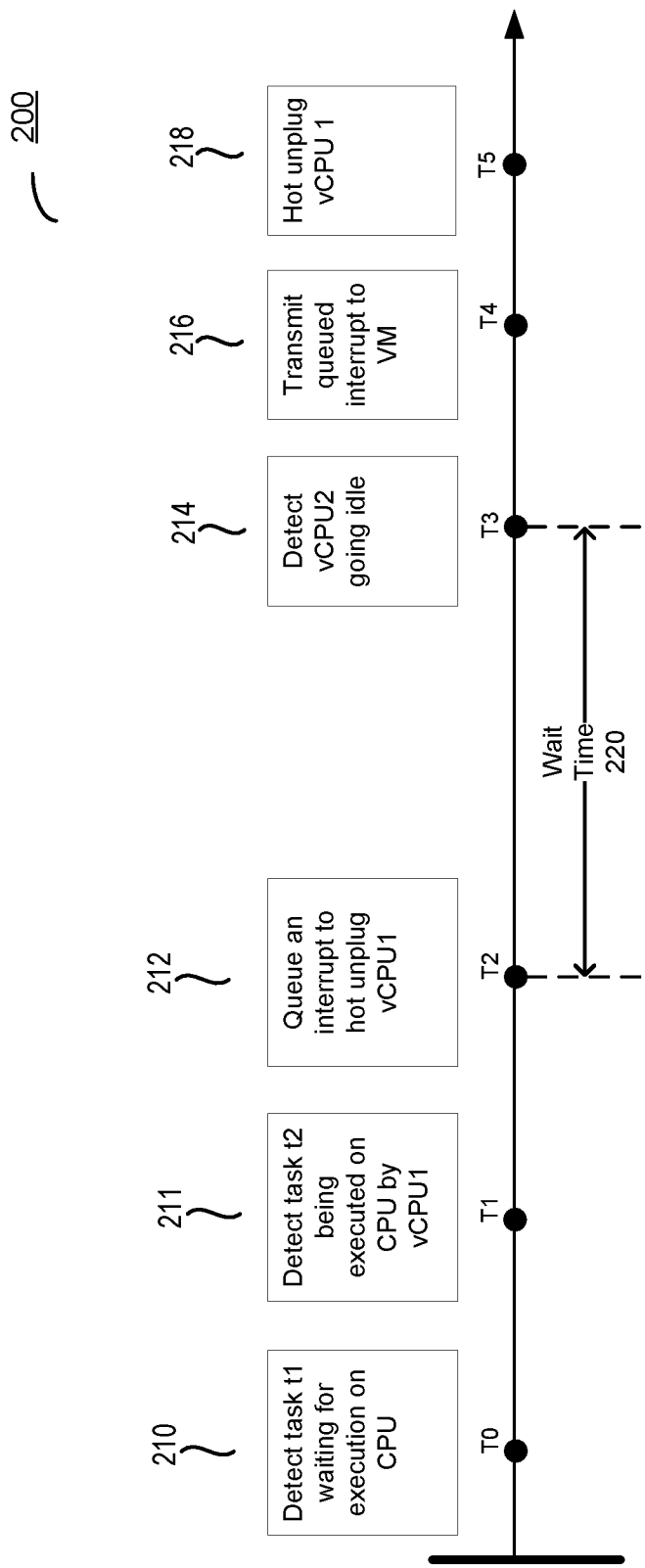
FIG. 2 depicts a sequence diagram illustrating the flow of events for an example method of managing processor overcommit in virtual machines, in accordance with one or more aspects of the present disclosure.

FIG. 2 depicts a sequence diagram illustrating the flow of events for an example method 200 of managing processor overcommit in virtual machines, in accordance with one or more aspects of the present disclosure. Method 200 may be performed by processing logic that includes hardware (e.g., circuitry, dedicated logic, programmable logic, microcode, etc.), software (e.g., instructions run on a processor to perform hardware simulation), or a combination thereof. Method 200 or each of its individual functions, routines, subroutines, or operations may be performed by one or more processors of a computer system (e.g., the computer system 500 of FIG. 5 or computer system 700 of FIG. 7) implementing the method. In an illustrative example, method 200 may be performed by a single processing thread. Alternatively, method 200 may be performed by two or more processing threads, each thread implementing one or more individual functions, routines, subroutines, or operations of the method. In an illustrative example, the processing threads implementing method 200 may be synchronized (e.g., using semaphores, critical sections, or other thread synchronization mechanisms). In certain implementations, vCPU1 and vCPU2 may be associated with one VM and may be implemented by a respective processing thread that may be scheduled to one of the host CPUs 120A-120K of FIG. 1.

In an illustrative example, at operation 210 the processing logic at time T0 may detect task t1 waiting for execution on a physical CPU. In implementations, waiting task t1 may indicate to the processing logic that the CPU is in an overcommitted state. The processing logic may further manage the CPU over-commitment in order to enable task t1 to be executed.

At operation 211, the processing logic at time t1 may detect task t2 of vCPU1 of VM1 being executed on the CPU. In implementations, the CPU may be implementing a thread executing vCPU1 of VM1. The processing logic may then decide to hot-unplug vCPU1 to enable task t1 to be executed by CPU. Subsequently, the processing logic at operation 212 may add a hot-unplug of vCPU1 interrupt to an execution queue at time t2. The execution queue may store the hot-unplug interrupt for a certain period of time or until a certain condition is satisfied, before sending the interrupt to VM1 for execution. In implementations, the processing logic may decide to queue the interrupt instead of transmitting it to VM1 in order to avoid introducing latencies and performance penalties by unplugging a vCPU while the VM is in the middle of execution. In implementations, the processing logic may decide to transmit the hot-unplug interrupt to VM1 when one of the vCPUs of VM1 goes idle.

At operation 214, the processing logic at time t3 may detect that vCPU2 of VM1 is transitioning to an idle state. For example, the processing logic may detect that vCPU2 is transitioning to the idle state because vCPU2 is performing a VM exit. In implementations, the processing logic may decide to wait for a configurable wait time period 220 for a vCPU to transition into the idle state. If the wait time period 220 exceeds the configurable time period, the processing logic may transmit the hot-unplug interrupt to VM1 using a shared memory region and may further remove the interrupt from the execution queue, as explained in more details herein at FIG. 4, Subsequent to detecting that vCPU2 is transitioning to the idle state, at operation 216 the processing logic may transmit the hot-unplug interrupt from the execution queue to the VM at time T4, and may delete the interrupt from the execution queue. In implementations, the request to hot-unplug a vCPU may be stored as a configuration setting in the metadata of the VM. When the hot-unplug request is transmitted to the VM, the configuration setting may be changed back to indicate that no more vCPUs of the VM need to be hot-unplugged.

At operation 218, the processing logic may cause vCPU1 to be hot-unplugged from VM1 at time T5, thus allowing task t1 to be executed by the CPU. In implementations, one of the vCPUs of the VM may execute the interrupt to hot-unplug vCPU1 from VM1. Hot unplugging a vCPU from the VM may refer to removing the vCPU from a set of vCPUs associated with the VM without causing the VM to shut down.

Figure 3:
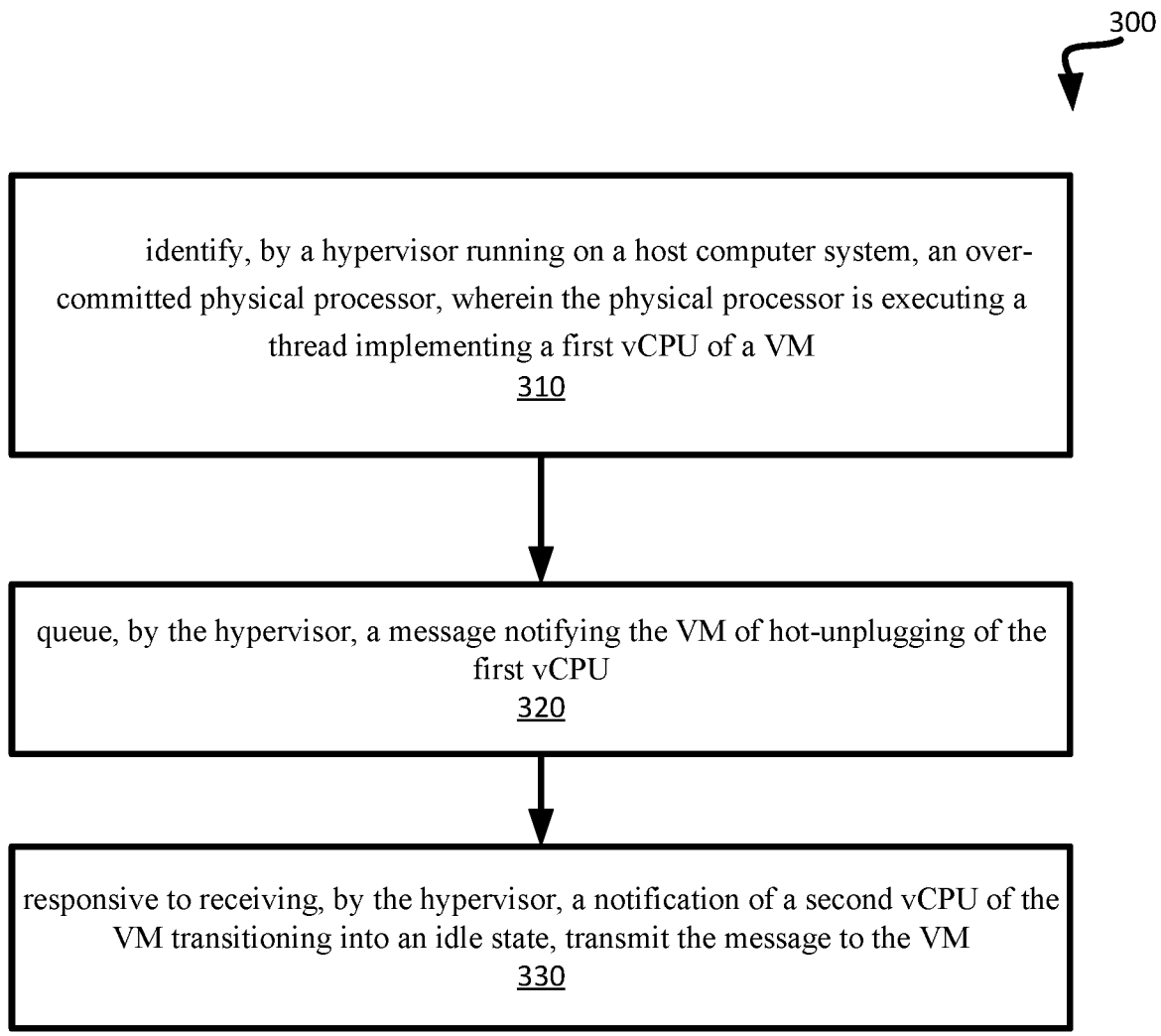
FIG. 3 is a flow diagram of an example method of performing CPU overcommit management for virtual machines, in accordance with one or more aspects of the present disclosure.

FIG. 3 is a flow diagram of an example method of performing CPU overcommit management for virtual machines, in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., the computer system 500 of FIG. 5 or computer system 700 of FIG. 7) implementing the method. In an illustrative example, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, or other thread synchronization mechanisms). Alternatively, the processing threads implementing method 300 may be executed asynchronously with respect to each other. Therefore, while FIG. 3 and the associated description lists the operations of method 300 in certain order, various implementations of the method may perform at least some of the described operations in parallel or in arbitrary selected orders.

Referring to FIG. 3, at block 310, the processing logic may identify, by a hypervisor running on a host computer system, an over-committed physical processor, wherein the physical processor is executing a thread implementing a first vCPU of a VM. In implementations, the processing logic may recognize an over-committed processor because a certain task has been waiting to be executed by the processor. Subsequently, the processing logic may decide to hot-unplug the first vCPU from the VM, in order to enable the waiting task to be executed by the processor, as described in more detail herein above.

At operation 320, the processing logic may queue a message notifying the VM of hot-unplugging of the first vCPU. In implementations, the processing logic may decide to queue the notification message instead of transmitting it to the VM in order to avoid introducing latencies and performance penalties by unplugging a vCPU while the VM is in the middle of execution. In implementations, the processing logic may decide to transmit the hot-unplug message to the VM when one of the vCPUs of the VM transitions into an idle state. In certain implementations, the notification message may be an inter-processor interrupt (IPI) sent to one of the vCPUs of the VM to hot-unplug the first vCPU, as explained in more details herein above.

At operation 330, responsive to receiving a notification that a second vCPU of the VM transitioning into an idle state, the processing logic may transmit the hot-unplug message to the VM to hot-unplug the first vCPU. In an illustrative example, the processing logic may detect that a second vCPU is transitioning to the idle state because the second vCPU is performing a VM exit. The processing logic may then remove the notification message of hot-unplugging the first vCPU from an execution queue associated with the VM, as explained in more details herein above.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. Each method described herein and/or each of its individual functions, routines, subroutines, or operations may be performed by one or more processing devices of the computer system (e.g., host 100 of FIG. 1) implementing the method. In certain implementations, the method may be performed by a single processing thread. Alternatively, the method may be performed by two or more processing threads, each thread executing one or more individual functions, routines, subroutines, or operations of the method. In an illustrative example, the processing threads implementing the method may be synchronized (e.g., using semaphores, critical sections, and/or other thread synchronization mechanisms). Alternatively, the processing threads implementing the method may be executed asynchronously with respect to each other.

Figure 4:
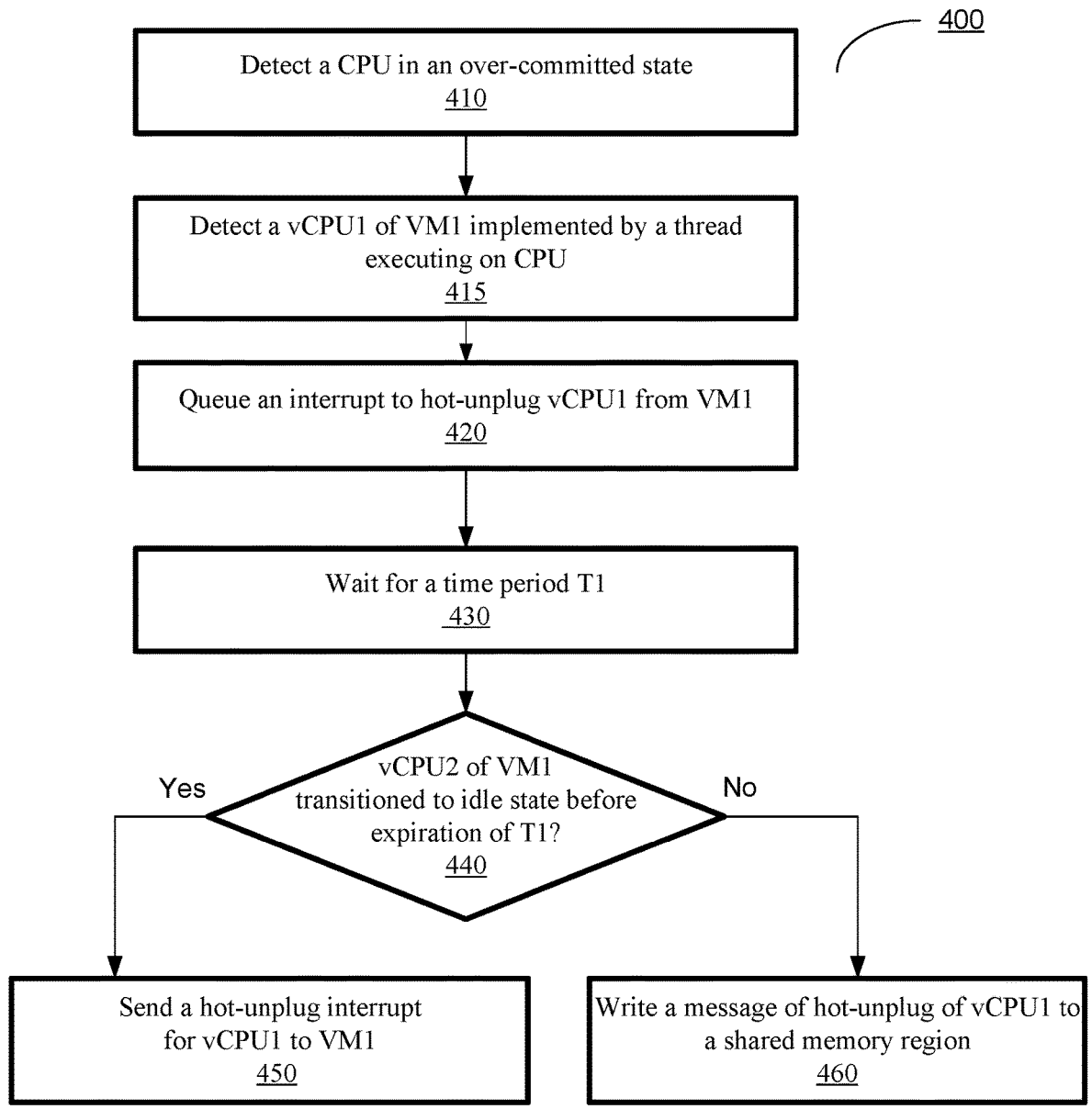
FIG. 4 is a flow diagram of an example method for performing CPU overcommit management for virtual machines using a shared memory region, in accordance with one or more aspects of the present disclosure.

FIG. 4 is a flow diagram of an example method 400 for performing CPU overcommit management for virtual machines using a shared memory region, in accordance with one or more aspects of the present disclosure. Method 400 may be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., the computer system 500 of FIG. 5 or computer system 700 of FIG. 7) implementing the method. In an illustrative example, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel or in arbitrary selected orders.

Referring to FIG. 4, at operation 410, the processing logic may detect a CPU in an over-committed state. In implementations, the processing logic may recognize that the CPU is in the over-committed state because a task has been waiting to be executed by the CPU, as explained in more details herein above. At operation 415, the processing logic may further detect a virtual processor vCPU1 of VM1 that is implemented by a thread executing on the CPU. The processing logic may decide to hot-unplug vCPU1 from VM1, in order to enable the waiting task to be executed by the CPU, as described in more detail herein above.

At operation 420, the processing logic may queue an interrupt to hot-unplug vCPU1 from VM1. In implementations, the processing logic may decide to send the hot-unplug interrupt to VM1 when one of the vCPUs of VM1 transitions into an idle state. In other implementations, if no vCPU of VM1 transitions into the idle state within a predetermined time period, the processing logic may decide to transmit the hot-unplug notification to VM1 using a shared memory region that is accessible to the vCPUs of VM1.

At operation 430, the processing logic may wait for a time period T1 for one of the vCPUs associated with VM1 to go into an idle state, such that the queued interrupt may be sent to VM1. At operation 450, if before the expiration of T1, the processing logic receives a notification that vCPU2 of VM1 is transitioning into an idle state, the processing logic may transmit the interrupt of hot-unplug of vCPU1 to VM1. The interrupt may then be processed by one of the vCPUs of VM1 to hot-unplug vCPU1.

On the other hand, if T1 expires and no vCPU of VM1 has transitioned into an idle state, the processing logic at operation 460 may decide to use shared memory to signal hot-unplug notification to VM1. The processing logic may send a message VM1 using memory monitoring. While in the guest execution mode, each vCPU of a VM may perform memory monitoring (e.g., using x86-64 MONITOR/MWAIT instructions, their analogs on other execution platforms, or other memory access instructions) in order to receive notifications of newly arriving interrupts from other vCPUs or the hypervisor. In this mode, the processing logic may send a message to a vCPU of the VM by updating a shared memory region that is accessible to all vCPUs of the VM. The vCPU may then receive the message by performing memory monitoring of the shared region, without having to perform a VM exit. In this case, the processing logic may use the shared memory region to send a notification message to VM1 to hot-unplug vCPU1. One of the vCPUs of VM1 may then read the message via memory monitoring and may perform an interrupt to hot-unplug vCPU1.

Figure 5:
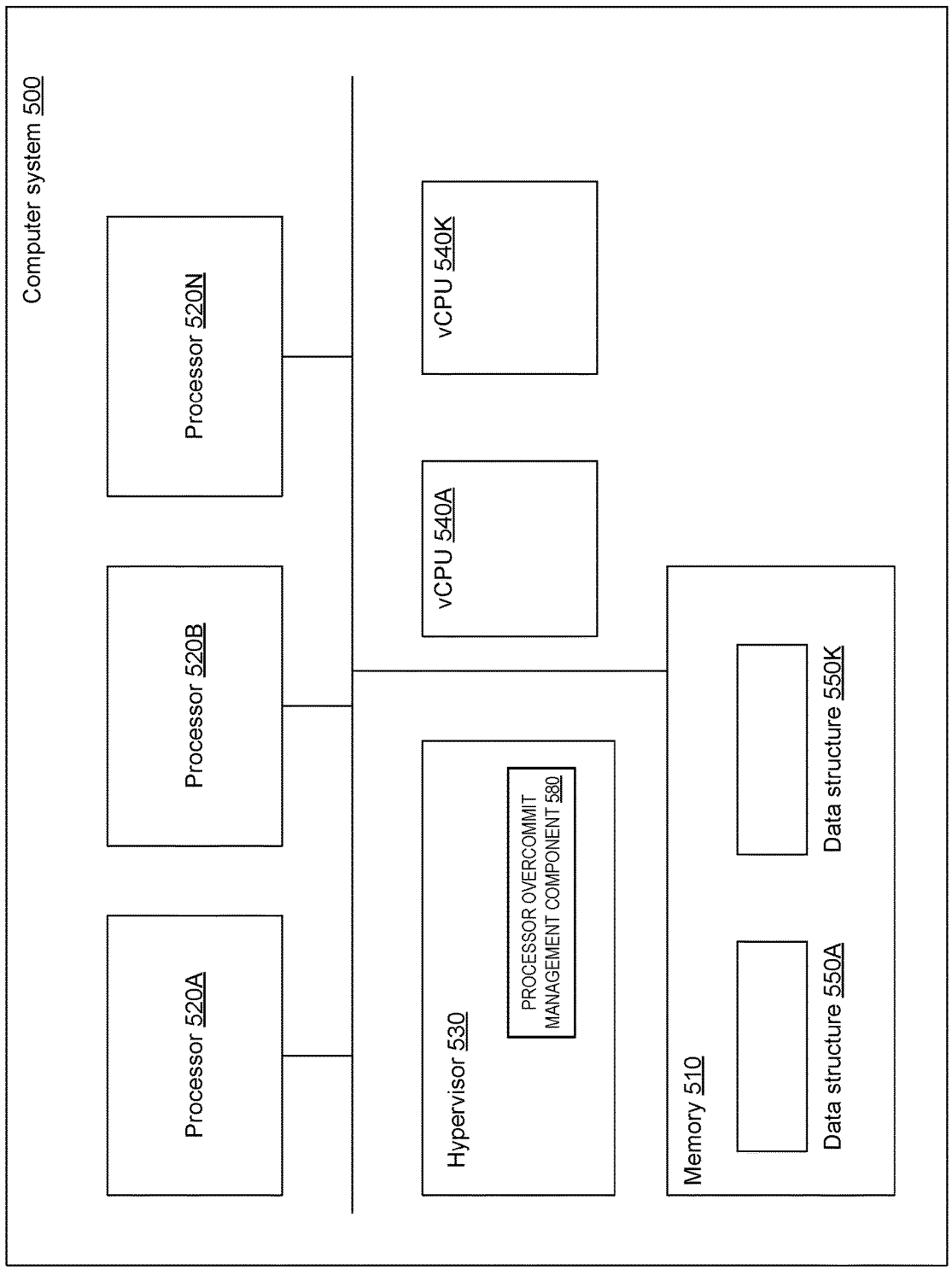
FIG. 5 depicts a block diagram of an illustrative computer system operating in accordance with one or more aspects of the disclosure.

FIG. 5 depicts a block diagram of an illustrative computer system 500 operating in accordance with one or more aspects of the disclosure. In various illustrative examples, computer system 500 may be represented by computer system 100 of FIG. 1. Computer system 500 comprises a memory 510 and one or more physical processors 520A-520N, that are operatively coupled to the memory 510 and executes code implementing hypervisor 530 and processing threads implementing virtual processors (vCPUs) 540A-540K of one or more virtual machines. The memory may store per-vCPU data structures 550A-550K to store memory monitoring objects. The hypervisor may include a processor overcommit management component 580 operating in accordance with one or more aspects of the present disclosure. In an illustrative example, processor overcommit management component 580 may implement methods 300, 400 and/or 600 of FIGS. 3, 4, and 6.

Figure 6:
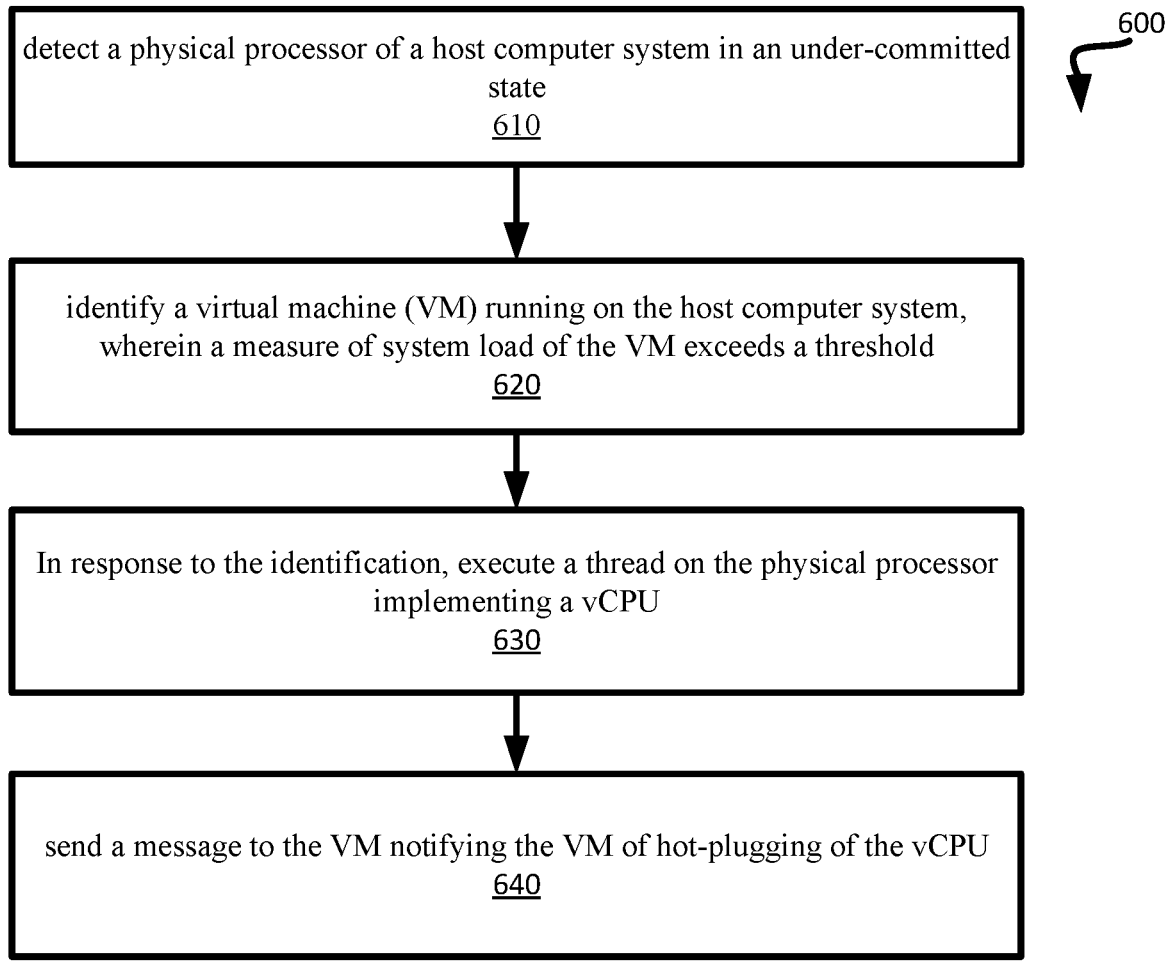
FIG. 6 is a flow diagram of an example method of performing CPU overcommit management for virtual machines, in accordance with one or more aspects of the present disclosure.

FIG. 6 is a flow diagram of an example method of performing CPU overcommit management for virtual machines, in accordance with one or more aspects of the present disclosure. Method 600 may be performed by processing logic that includes hardware (e.g., circuitry, dedicated logic, programmable logic, microcode, etc.), software (e.g., instructions run on a processor to perform hardware simulation), or a combination thereof. Method 600 or each of its individual functions, routines, subroutines, or operations may be performed by one or more processors of a computer system (e.g., the computer system 500 of FIG. 5 or computer system 700 of FIG. 7) implementing the method. In an illustrative example, method 600 may be performed by a single processing thread. Alternatively, method 600 may be performed by two or more processing threads, each thread implementing one or more individual functions, routines, subroutines, or operations of the method. In an illustrative example, the processing threads implementing method 600 may be synchronized (e.g., using semaphores, critical sections, or other thread synchronization mechanisms). Alternatively, the processing threads implementing method 600 may be executed asynchronously with respect to each other. Therefore, while FIG. 6 and the associated description lists the operations of method 600 in certain order, various implementations of the method may perform at least some of the described operations in parallel or in arbitrary selected orders.

Referring to FIG. 6, at block 610, the processing logic may detect a physical processor of a host computer system in an under-committed state. In implementations, an under-committed physical processor may be a physical processor that is executing a number of tasks per unit time that does not meet a predetermined threshold. For example, a physical processor may be in the under-committed state if the number of CPU cycles of the physical processor consumed in executing tasks during a certain period of time is less than a certain threshold. In other examples, an under-committed processor may be a processor having a number of context switches per unit of time between threads executed by the processor that do not meet a certain threshold, thus indicating that the processor may not busy executing multiple threads.

At operation 620, the processing logic may decide to use the under-committed processor to execute a new virtual processor for one of the VMs running on the host. The processing logic may then identify a virtual machine (VM) running on the host computer system, wherein a measure of system load of the VM exceeds a threshold. In implementations, the measure of system load of the VM may be based on a number of physical processor cycles consumed executing the virtual processors of the VM. In this case, the measure of system load may indicate that the VM may efficiently use a new vCPU that may be executed on the processor.

At operation 630, in response to identifying the VM with a large system load, the processing logic may execute a thread on the physical processor implementing a new vCPU. In implementations, the new vCPU may be created in association with the VM. At operation 640, the processing logic may then send a message to the VM notifying the VM of hot-plugging of the new vCPU. In certain implementations, hot-plugging of the new vCPU may refer to adding the new vCPU to a set of vCPUs associated with the VM without shutting down the VM. In one implementation, sending the notification message to the VM may refer to transmitting an inter-processor interrupt (IPI) to a vCPU of the VM to hot-plug the new vCPU, as explained in more details herein above.

Figure 7:
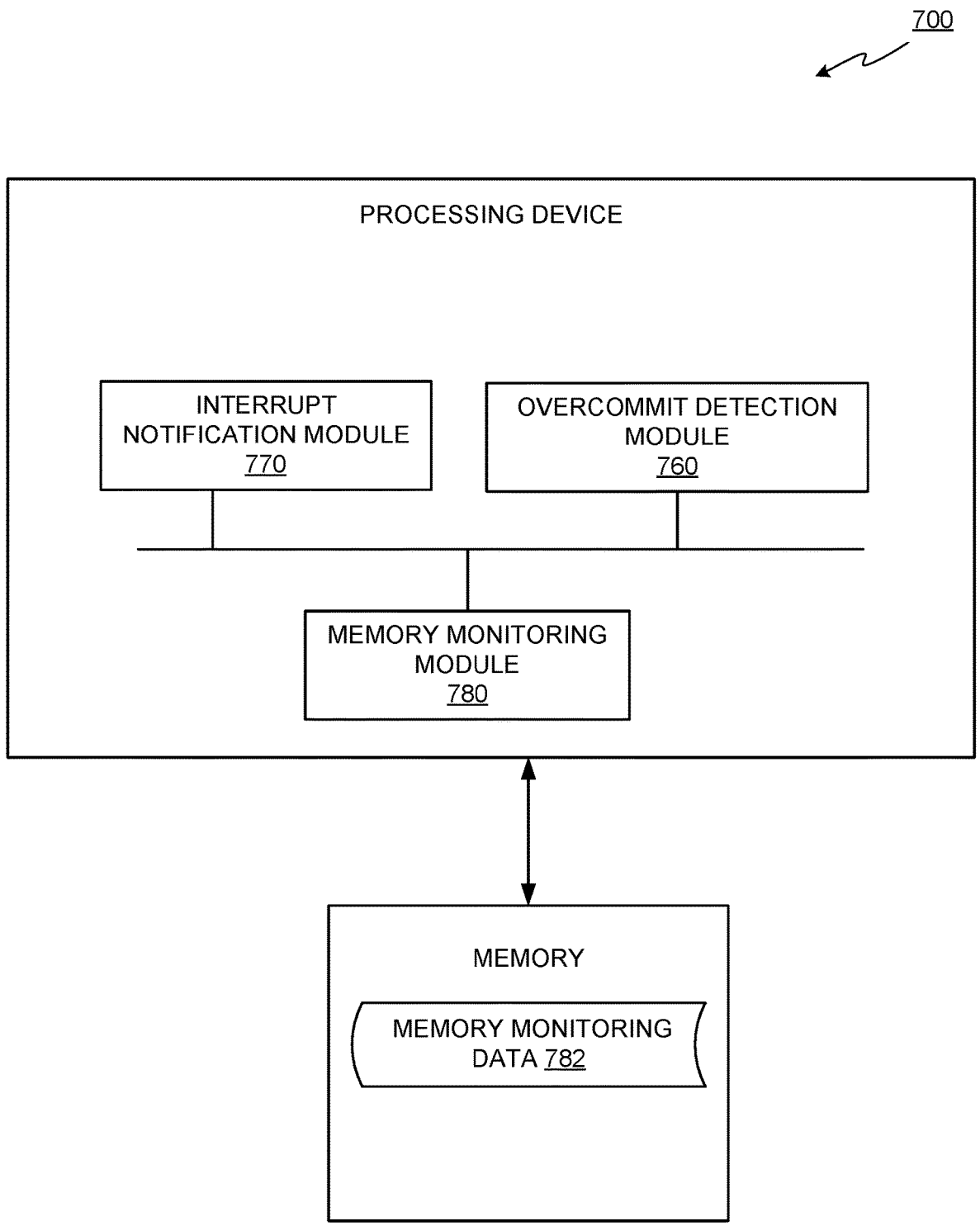
FIG. 7 is a depicts a block diagram of an example computer system in accordance with one or more aspects of the present disclosure

FIG. 7 depicts a block diagram of an example computer system 700 in accordance with one or more aspects of the present disclosure. Computer system 700 may include one or more processing devices and one or more memory devices. In the example shown, computer system 700 may include an overcommit detection module 760, an interrupt notification module 770, and a memory monitoring module 780. The overcommit detection module 760 may be where processor over-commitment or under-commitment is detected by the processing device. Interrupt notification module 770 may be where a notification message of hot-plug of a processor and hot-unplug of a processor may be queued and transmitted to a virtual machine. Memory monitoring module 780 may be where the processing logic updates a shared memory region to notify the VM of hot-unplug of a vCPU associated with the VM.

Overcommit detection module 760 may enable processing device to detect that a physical processor is in an overcommitted state. In implementations, the processing device may determine that the processor is in the overcommitted state by detecting that a certain task has been waiting to be executed by the processor, while the processor is currently executing another task, as explained in more details herein. Overcommit detection module 760 may then determine that a vCPU running on the overcommitted processor may be hot-unplugged. In implementations, overcommit detection module 760 further detect a processor in an under-committed state. For example, a processor may be in the under-committed state if the number of CPU cycles of the processor consumed in executing tasks during a certain time period is less than a certain threshold. Overcommit detection module 760 may then determine that a new vCPU may run on the under-committed processor and may be hot-plugged to a busy VM, as explained in details herein. Upon identifying a vCPU for hot-unplugging, the overcommit detection module 760 may store a configuration change in metadata of the virtual machine, indicating that the identified vCPU should be hot-unplugged at a later time (e.g., when another vCPU of the VM foes idle).

Interrupt notification module 770 may be responsible for queuing an interrupt of hot-unplugging a vCPU associated with a VM when notified by overcommit detection module 760 that the processor executing the vCPU is in an overcommit state, as explained in more details herein. Interrupt notification module 770 may further be responsible for transmitting the hot-unplug interrupt to the VM upon detecting that another vCPU of the VM is transitioning to idle, as explained in details herein. In implementations, the interrupt notification module 770 may transmit an interrupt of hot-plug of a vCPU to a VM when notified by overcommit detection module 760 that the processor where the VM is running is in an under-commit state, as explained in more details herein. In other implementations, interrupt notification module 770 may detect that one of the vCPUs of a VM is transitioning into an idle state and may consequently determine whether a configuration change request of hot-unplugging another vCPU of the VM is pending. If a configuration change of hot-unplugging is pending, interrupt notification module 770 may then transmit a message notifying the VM of hot-unplugging of the vCPU, and may then mark the pending configuration change request as complete.

Memory monitoring module 780 may enable processing device to send a notification message of hot-unplugging of a vCPU using a shared memory region. Another vCPU may receive the message by monitoring the shared memory region. In one implementation, while in the guest execution mode, each vCPU may perform memory monitoring (e.g., using x86-64 MONITOR/MWAIT instructions, their analogs on other execution platforms, or other memory access instructions) in order to receive messages (e.g. notifications of newly arriving interrupts). Processing device may use memory monitoring data 782 to store memory monitoring objects, as described in more details herein above.

Figure 8:
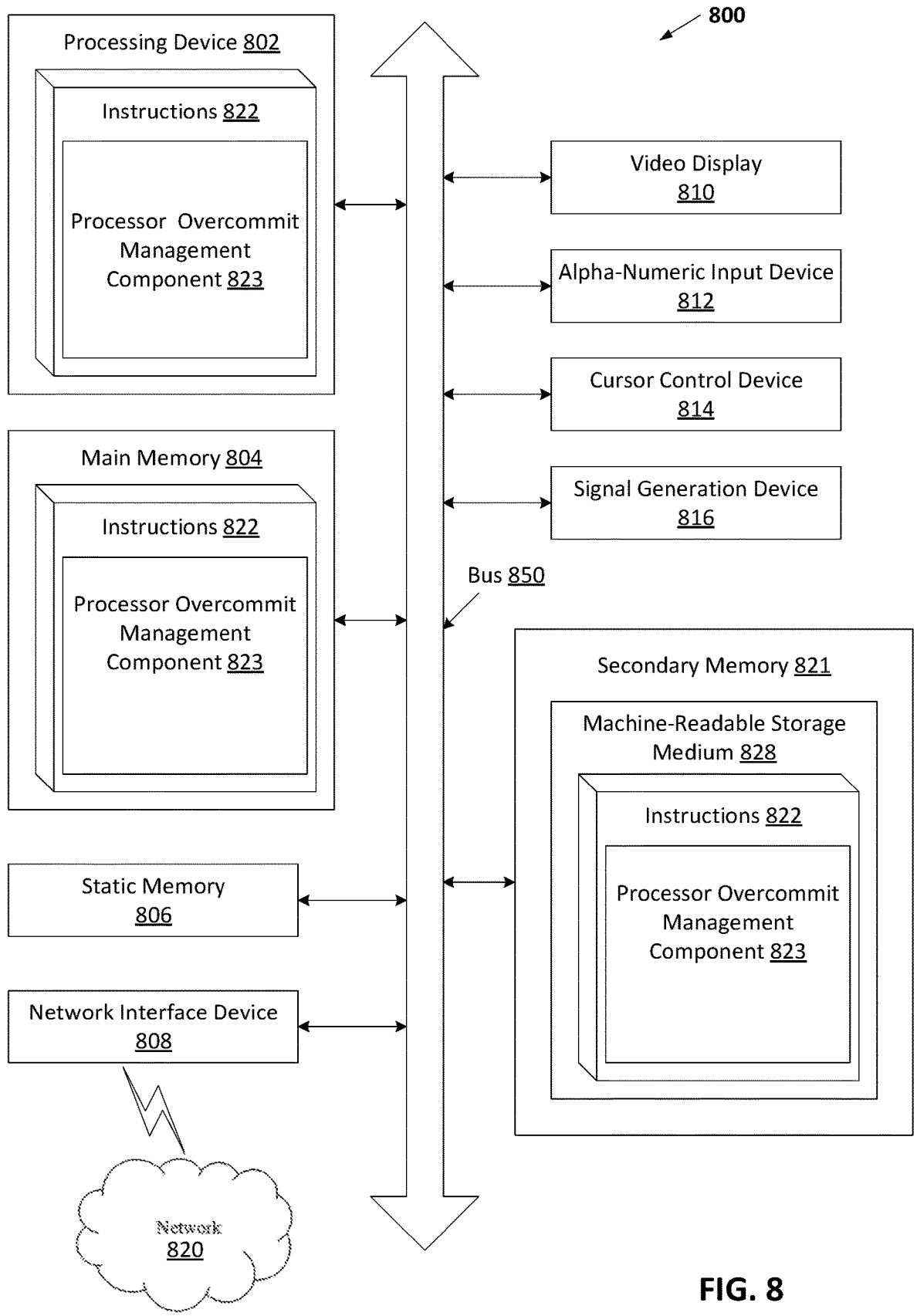
FIG. 8 illustrates a diagrammatic representation of a machine in the exemplary form of a computer system, in accordance with one or more aspects of the present disclosure.

FIG. 8 illustrates a diagrammatic representation of a machine in the exemplary form of a computer system 800 within which a set of instructions, for causing the machine to perform any one or more of the methodologies discussed herein, may be executed. The computer system 800 may correspond to host 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 816 (e.g., a data storage device), which communicate with each other via a bus 850.

The processing device 802 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 802 may therefore include multiple processors. The processing device 802 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 802 may also be one or more special-purpose processing devices such as an application specific integrated circuit (ASIC), a field programmable gate array (FPGA), a digital signal processor (DSP), network processor, or the like.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The secondary memory 821 may include a machine-readable storage medium (or more specifically a computer-readable storage medium) 828 on which is stored one or more sets of instructions 822 embodying any one or more of the methodologies or functions described herein (e.g., processor overcommit management component 823). The instructions 822 may also reside, completely or at least partially, within the main memory 804 and/or within the processing device 802 during execution thereof by the computer system 800; the main memory 804 and the processing device 802 also constituting machine-readable storage media.

While computer-readable storage medium 828 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "reading," "setting," "detecting," "obtaining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300-400 of FIGS. 3-4 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computer system designs and configurations may also be suitable to implement the systems and methods described herein. The following examples illustrate various implementations in accordance with one or more aspects of the present disclosure.

Example 1 is a method comprising: identifying, by a hypervisor running on a host computer system, an over-committed physical processor, wherein the physical processor is executing a thread implementing a first virtual processor (vCPU) of a virtual machine (VM); queuing, by the hypervisor, a message notifying the VM of hot-unplugging of the first vCPU; and responsive to receiving, by the hypervisor, a notification of a second vCPU of the VM transitioning into an idle state, transmitting the message to the VM.

Example 2 is a method of example 1, wherein identifying the over-committed physical processor comprises: determining that a task is waiting to be executed by the physical processor while the physical processor is executing the thread implementing the first vCPU.

Example 3 is a method of example 2, wherein the task is a second thread implementing a second vCPU of a second VM.

Example 4 is a method of example 1, wherein the first vCPU and the second vCPU are the same vCPU.

Example 5 is a method of example 1, wherein the message to the VM further comprises an inter-processor interrupt (IPI) to unplug the first vCPU.

Example 6 is a method of example 1, wherein hot-unplugging of the first vCPU comprises removing the first vCPU from a set of vCPUs associated with the VM without shutting down the VM.

Example 7 is a method of example 1 further comprising: responsive to waiting for a predetermined period of time, sending the message to the VM using a shared memory region that is accessible to the vCPUs of the VM.

Example 8 is a system comprising: a memory; and a processing device operatively coupled to the memory, wherein the processing device is further to: detect a physical processor of a host computer system in an under-committed state; identify a virtual machine (VM) running on the host computer system, wherein a measure of a system load of the VM exceeds a threshold; execute a thread implementing a vCPU on the physical processor; and notify the VM of hot-plugging of the vCPU.

Example 9 is a system of example 8, wherein to detect that the physical processor is in the under-committed state, the processing device is further to detect that a number of CPU cycles of the physical processor consumed in executing tasks during a predetermined time period satisfies a threshold condition.

Example 10 is a system of example 8, wherein to detect that the physical processor is in the under-committed state, the processing device is further to detect that a number of context switches per unit of time between threads executed by the physical processor satisfies a threshold condition.

Example 11 is a system of example 8, wherein the measure of the system load of the VM comprises a ratio of physical CPU cycles consumed executing a vCPU of the VM.

Example 12 is a system of example 11, wherein the measure of the system load of the VM further comprises a number of physical CPU cycles consumed executing a virtual processor of the VM during a predetermined period of time.

Example 13 is a system of example 8, wherein the message to the VM further comprises an IPI to hot-plug the second vCPU.

Example 14 is a non-transitory computer-readable storage medium comprising executable instructions that, when executed by a processing device, cause the processing device to: detect that a first vCPU of a VM running on a host computer system is transitioning into an idle state; responsive to the detection, determine whether a configuration change request of hot-unplugging a second vCPU of the VM is pending; responsive to determining that the configuration change request of hot-unplugging the second vCPU of the VM is pending, transmit a message notifying the VM of hot-unplugging of the second vCPU; and mark the configuration change request as complete.

Example 15 a non-transitory computer-readable storage medium of example 14, wherein the configuration change request corresponds to a determination that at least one of a plurality of vCPUs of the VM is being executed by an over-committed physical processor of the host computer system.

Example 16 is a non-transitory computer-readable storage medium of example 15, wherein to identify the over-committed physical processor, the processing logic is further to detect that a first task is waiting to be executed by the physical processor while the physical processor is executing a second task.

Example 17 is a non-transitory computer-readable storage medium of example 14, wherein the message to the VM further comprises an IPI to hot-unplug the second vCPU.

Example 18 a non-transitory computer-readable storage medium of example 14, wherein hot-unplugging of the second vCPU further comprises removing the second vCPU from a set of vCPUs associated with the VM without shutting down the VM.

Example 19 is a non-transitory computer-readable storage medium of example 14, wherein to detect that the first vCPU is transitioning into the idle state, the processing logic is further to detect that the first vCPU is executing a VM exit instruction.

Example 20 is a non-transitory computer-readable storage medium of example 14, wherein the processing device is further to: responsive to waiting for a predetermined period of time, send the message to the VM using a shared memory region that is accessible to the vCPUs of the VM.

Example 21 is an apparatus comprising: a means to detect a physical processor of a host computer system in an under-committed state; a means to identify a virtual machine (VM) running on the host computer system, wherein a measure of a system load of the VM exceeds a threshold; a means to execute a thread implementing a vCPU on the physical processor; and a means to notify the VM of hot-plugging of the vCPU.

Example 22 is an apparatus of example 21, wherein a means to detect that the physical processor is in the under-committed state, the processing device further comprises a means to detect that a number of CPU cycles of the physical processor consumed in executing tasks during a predetermined time period satisfies a threshold condition.

Example 23 is an apparatus of example 21, wherein a means to detect that the physical processor is in the under-committed state further comprises a means to detect that a number of context switches per unit of time between threads executed by the physical processor satisfies a threshold condition.

Example 24 is an apparatus of example 21, wherein the measure of the system load of the VM comprises a ratio of physical CPU cycles consumed executing a vCPU of the VM.

Example 25 is an apparatus of example 24, wherein the measure of the system load of the VM further comprises a number of physical CPU cycles consumed executing a virtual processor of the VM during a predetermined period of time.

Example 26 is an apparatus of example 21, wherein the message to the VM further comprises an IPI to hot-plug the second vCPU.

Example 27 is an electronic device, comprising: a memory; and a processing device operatively coupled to the memory, wherein the processing device is further to: detect that a first vCPU of a VM running on a host computer system is transitioning into an idle state; responsive to the detection, determine whether a configuration change request of hot-unplugging a second vCPU of the VM is pending; responsive to determining that the configuration change request of hot-unplugging the second vCPU of the VM is pending, transmit a message notifying the VM of hot-unplugging of the second vCPU; and mark the configuration change request as complete.

Example 28 is an electronic device example 27, wherein the configuration change request corresponds to a determination that at least one of a plurality of vCPUs of the VM is being executed by an over-committed physical processor of the host computer system.

Example 29 is an electronic device example 27, wherein to identify the over-committed physical processor, the processing logic is further to detect that a first task is waiting to be executed by the physical processor while the physical processor is executing a second task.

Example 30 is an electronic device example 27, wherein the message to the VM further comprises an IPI to hot-unplug the second vCPU.

Example 31 is an electronic device example 27, wherein hot-unplugging of the second vCPU further comprises removing the second vCPU from a set of vCPUs associated with the VM without shutting down the VM.

Example 32 is an electronic device example 27, wherein to detect that the first vCPU is transitioning into the idle state, the processing logic is further to detect that the first vCPU is executing a VM exit instruction.

Example 33 is an electronic device example 27, wherein the processing device is further to: responsive to waiting for a predetermined period of time, send the message to the VM using a shared memory region that is accessible to the vCPUs of the VM.

What is claimed is:

1. A method comprising:
identifying, by a hypervisor running on a host computer system, an over-committed physical processor, wherein the physical processor is executing a thread implementing a first virtual processor (vCPU) of a virtual machine (VM);
queuing, by the hypervisor, a message notifying the VM of hot-unplugging of the first vCPU; and
responsive to receiving, by the hypervisor, a notification of a second vCPU of the VM transitioning into an idle state, transmitting the message to the VM.

2. The method of claim 1, wherein identifying the over-committed physical processor comprises:
determining that a task is waiting to be executed by the physical processor while the physical processor is executing the thread implementing the first vCPU.

3. The method of claim 2, wherein the task is a second thread implementing a second vCPU of a second VM.

4. The method of claim 1, wherein the first vCPU and the second vCPU are the same vCPU.

5. The method of claim 1, wherein the message to the VM further comprises an inter-processor interrupt (IPI) to unplug the first vCPU.

6. The method of claim 1, wherein hot-unplugging of the first vCPU comprises removing the first vCPU from a set of vCPUs associated with the VM without shutting down the VM.

7. The method of claim 1, wherein transmitting the message to the VM is performed via a shared memory region that is accessible to the vCPUs of the VM.

8. A non-transitory computer-readable storage medium comprising executable instructions that, when executed by a processing device, cause the processing device to:
detect that a first virtual processor (vCPU) of a virtual machine (VM) running on a host computer system is transitioning into an idle state;
responsive to the detection, determine whether a configuration change request of hot-unplugging a second vCPU of the VM is pending;
responsive to determining that the configuration change request of hot-unplugging the second vCPU of the VM is pending, transmit a message notifying the VM of hot-unplugging of the second vCPU; and
mark the configuration change request as complete.

9. The non-transitory computer-readable storage medium of claim 8, wherein the configuration change request corresponds to a determination that at least one of a plurality of vCPUs of the VM is being executed by an over-committed physical processor of the host computer system.

10. The non-transitory computer-readable storage medium of claim 9, wherein to identify the over-committed physical processor, the processing logic is further to detect that a first task is waiting to be executed by the physical processor while the physical processor is executing a second task.

11. The non-transitory computer-readable storage medium of claim 8, wherein the message to the VM further comprises an IPI to hot-unplug the second vCPU.

12. The non-transitory computer-readable storage medium of claim 8, wherein hot-unplugging of the second vCPU further comprises removing the second vCPU from a set of vCPUs associated with the VM without shutting down the VM.

13. The non-transitory computer-readable storage medium of claim 8, wherein to detect that the first vCPU is transitioning into the idle state, the processing logic is further to detect that the first vCPU is executing a VM exit instruction.

14. The non-transitory computer-readable storage medium of claim 8, wherein the processing device is further to:

responsive to waiting for a predetermined period of time, send the message to the VM using a shared memory region that is accessible to the vCPUs of the VM.

15. A system comprising:
a memory; and
a processing device operatively coupled to the memory, wherein the processing device is to:
identify an over-committed physical processor, wherein the physical processor is executing a thread implementing a first virtual processor (vCPU) of a virtual machine (VM);
queuing a message notifying the VM of hot-unplugging of the first vCPU; and
responsive to receiving a notification of a second vCPU of the VM transitioning into an idle state, transmitting the message to the VM.

16. The system of claim 15, wherein identifying the over-committed physical processor comprises:
determining that a task is waiting to be executed by the physical processor while the physical processor is executing the thread implementing the first vCPU.

17. The system of claim 16, wherein the task is a second thread implementing a second vCPU of a second VM.

18. The system of claim 15, wherein the first vCPU and the second vCPU are the same vCPU.

19. The system of claim 15, wherein the message to the VM further comprises an inter-processor interrupt (WI) to unplug the first vCPU.

20. The system of claim 15, wherein hot-unplugging of the first vCPU comprises removing the first vCPU from a set of vCPUs associated with the VM without shutting down the VM.

* * * * *